United States Patent [19]

Robinson

[11] Patent Number: 5,068,823

[45] Date of Patent: Nov. 26, 1991

[54] PROGRAMMABLE INTEGRATED CIRCUIT USING TOPOLOGICAL AND PARAMETRIC DATA TO SELECTIVELY CONNECT AND CONFIGURE DIFFERENT HIGH LEVEL FUNCTIONAL BLOCKS THEREOF

[75] Inventor: Jeffrey I. Robinson, New Fairfield, Conn.

[73] Assignee: Star Semiconductor Corporation, Warren, N.J.

[21] Appl. No.: 217,616

[22] Filed: Jul. 11, 1988

[51] Int. Cl.$^5$ .......................... G06F 15/20; G06F 9/00
[52] U.S. Cl. .................................. 395/500; 364/927.8; 364/929.1; 364/949; 364/949.4; 364/DIG. 2
[58] Field of Search ... 364/200 MS File, 900 MS File, 364/490, 491, 716; 307/465; 340/825.83, 825.85, 825.86, 825.89

[56] References Cited

U.S. PATENT DOCUMENTS

| | | | |
|---|---|---|---|
| 4,377,849 | 3/1983 | Finger et al. | 364/491 |
| 4,467,409 | 8/1984 | Potash et al. | 364/200 |
| 4,631,686 | 12/1986 | Ikawa et al. | 364/490 |
| 4,703,436 | 10/1987 | Varshney | 364/490 |
| 4,786,904 | 11/1988 | Grahm, III et al. | 340/825.83 |
| 4,791,602 | 12/1988 | Resnick | 364/900 |
| 4,845,633 | 7/1989 | Furtek | 364/490 |
| 4,855,743 | 8/1989 | Hester | 364/900 X |
| 4,864,381 | 9/1989 | Seefeldt et al. | 307/465 X |
| 4,870,302 | 9/1989 | Freeman | 307/465 |
| 4,896,272 | 1/1990 | Kurosawa | 364/491 |
| 4,967,340 | 10/1990 | Dawes | 364/200 |

Primary Examiner—Thomas C. Lee
Attorney, Agent, or Firm—David P. Gordon

[57] ABSTRACT

An apparatus architecture is provided which permits an easily programmed apparatus to serve as an equivalent of an integrated circuit chip, and/or as a building block for a large system. The apparatus is connected to a communications bus which receives apparatus parameter and topological information from a host processor and/or memory. The apparatus includes numerous functional blocks, a core, and a parametric bus. The functional blocks such as serial and parallel ports, D/A and A/D converters, biquad filters, etc. serve to process signal data and are connected in any desired manner through a switching matrix located in the core. The topology of the switching matrix is received via the communication bus. Parameters for the functional blocks are sent to the functional blocks via the communications bus, the core, and the parametric bus. Topological and/or parametric data may be burned into the switch matrix and functional blocks as permanent programmed memory, or held in programmable nonvolatile or volatile memory associated with the core and functional blocks. Signal data is typically received and transmitted via the serial and/or parallel ports and via the D/A and A/D converters (functional blocks) of the apparatus. The signal data is processed extremely quickly by having the parameterized functional blocks perform their operations on the signal data and by forwarding the results to another functional block via the topologically arranged switching matrix. Each apparatus can be made part of a larger wafer-scale system including several identical or architecturally similar apparatus by providing links between the cores of the apparatus.

20 Claims, 4 Drawing Sheets

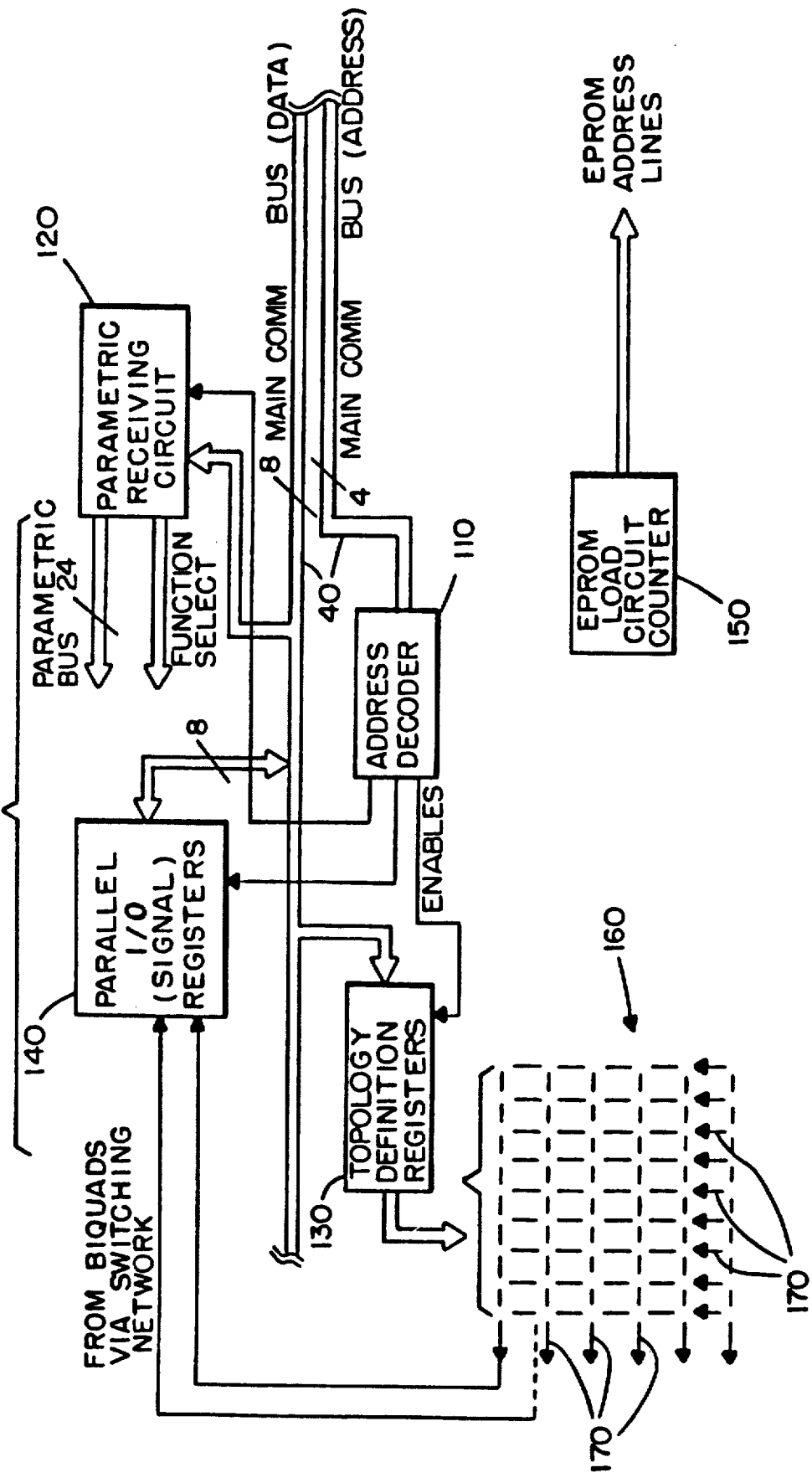

PROGRAMMABLE INTEGRATED CIRCUIT USING TOPOLOGICAL AND PARAMETRIC DATA TO SELECTIVELY CONNECT AND CONFIGURE DIFFERENT HIGH LEVEL FUNCTIONAL BLOCKS THEREOF

BACKGROUND OF THE INVENTION

The present invention generally relates to programmable circuit devices. More particularly, the present invention relates to an architecture that permits the instantaneous realization of certain classes of systems in integrated circuit or discrete component form.

The task of making a commercial integrated circuit is expensive both in terms of time and money. Typically, a desired circuit is designed in a laboratory and modelled. Specifications for the design are then drawn and an integrated circuit design is made from the desired specifications. An integrated circuit is then fabricated according to known techniques. The cost from design to first fabrication is often in the tens of thousands of dollars, and time frame is usually several months. However, after fabrication, the chip must first be tested for errors in specification or design. Such errors, which are rather common, force the redesign of the chip and require another fabrication procedure. Before the entire process is finished, the cost to the designer will be in the many tens of thousands of dollars, if not hundreds of thousands, and the time from start to finish could very well be well over a year.

In light of the above, it is clear that the task of creating an integrated circuit is fraught with many shortcomings. Besides the actual costs of designing a functioning chip, the large delays inherent in the process can impart a financial burden in lost revenues. Moreover, the rigid nature of the design process does not allow for interactive product development. Thus, desirable changes are not easily worked into the design, and because of time and dollar constraints may never be incorporated into the final product. Likewise, where an exact determination of the performance of a component is not obtainable in advance, current integrated circuit design techniques would require a user to breadboard his system and then latterally size and cost reduce it with integrated circuits. Such a method is slow and expensive and is open to a multitude of problems in translating breadboards into chip.

Even after a chip has been perfected, it has to be produced in volume for production. The "productization" of a chip is the process of understanding the failure mechanisms that can limit yield and correcting for them Increasing the yield reduces the cost of the chip and increases the security of supply. However, increasingly, application specific integrated circuits have been desired resulting in lower volumes of a greater number of different chips. The "productization" of a lower volume chip introduces another significant cost to the overall process. Moreover, with lower volumes, the designer will often face significant inventory problems, as lead times are usually on the order of a few months, but sales from month to month may be quite uneven.

Despite the many shortcomings of the standard manner of producing integrated circuits (ICs), the use of such ICs is virtually mandatory in the production of all electronic products as they could not be constructed with reasonable size and sold at a marketable price without them. On the other hand, the lead time necessary to produce an IC and the cost involved establish a significant entry barrier.

SUMMARY OF THE INVENTION

It is therefore an object of the invention to provide an architecture for the expeditious and cost-effective production of circuitry.

It is a further object of the invention to provide a single apparatus of an integrated circuit nature capable of being programmed to perform a multitude of useful functions at the command of a user.

It is yet a further object of the invention to provide a system using a plurality of identical apparatus, or a plurality of apparatus of similar architecture, the system being capable of being arranged to perform any of a multitude of desired complex functions at very high speed.

It is even another object of the invention to provide a user-friendly system which can take desired configurations and requirements of a user and provide a parameterized, configured circuit capable of conducting desired functions at very high speed.

In accord with the objects of the invention, an apparatus is provided which can either serve as the equivalent of an integrated circuit chip, and/or as a building block for a large system. The apparatus includes numerous functional blocks such as serial and parallel ports, D/A and A/D converters, biquad filters, etc. which can be connected in any desired manner through a switching matrix located in a core. The core controls the switching matrix (topological data) as well as controlling the flow of parametric data to the functional blocks which sets the parameters of the functional blocks. Topological and parametric data are first received by the core via a communications bus from an external processor which generates the data, or from an external memory means which stores the data in memory for forwarding to the apparatus upon powering up of the same. The topological data is stored at the core, while the parametric data is forwarded to the functional blocks via a parametric bus. If desired, topological and/or parametric data may be burned into the switch matrix and functional blocks as permanent programmed memory, or held as programmable nonvolatile (EPROM) or volatile memory (RAM) associated with the core and functional blocks. Signal data, on the other hand, is typically received and transmitted via the serial and/or parallel ports and via the D/A and A/D converters (functional blocks) of the apparatus. Thus, the signal data is processed extremely quickly by having the parameterized functional blocks perform their operations on signal data and by forwarding the results to another functional block via the topologically arranged switching matrix.

Each provided apparatus can be made part of a larger system including several identical or architecturally similar apparatus by providing links between the cores of the apparatus. In this manner, each apparatus is a node of a larger system. To maintain processing speed and simplify interconnections, the links between the cores only carry signal and timing data.

Preferably, the provided apparatus and system are part of a user-friendly custom chip building system. Software is provided to permit a user to specify a desired arrangement of functional blocks and parameters for each block. In fact, preferably, a user could draw a desired filter frequency response, and the system could determine the required filter with its filter transfer function which could accomplish the desired output. The system could then automatically configure the apparatus by generating and providing the necessary topological data as well as the parametric data. The user would then be able to test the functioning of the apparatus in its desired environment. If changes were required either in the format of the chip apparatus (i.e. topological changes) or in the parameters of the functional blocks (i.e. parametric changes), the necessary reprogramming would be easily accomplished and the apparatus could be retested. When the desired results are obtained, the master program containing the topologic, parametric and necessary signal data can be stored, or, if changes in the matrix switching or functional block parameters are not necessary during the running of the program, the parameters and topology can be burned into the chip.

A better understanding of the invention, and additional advantages and objects of the invention will become apparent to those skilled in the art upon reference to the detailed description and the accompanying drawings.

BRIEF DESCRIPTION OF THE DRAWINGS

FIG. 2 is a block diagram of the core of the apparatus of the invention;

DETAILED DESCRIPTION OF THE PREFERRED EMBODIMENT

Figure 1:
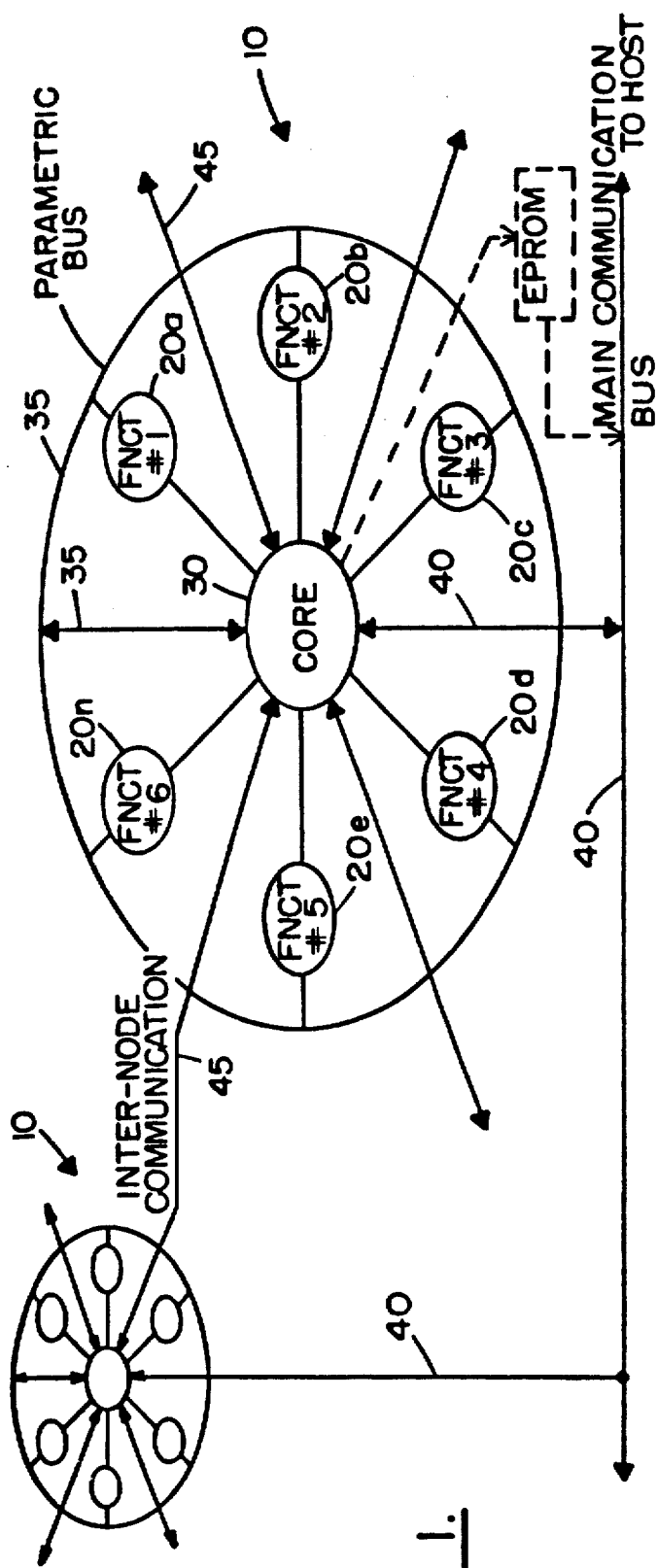
FIG. 1 is a block diagram of the programmable apparatus of the invention.

The basic concepts and architecture of the programmable apparatus 10 of the invention are seen in FIG. 1. The apparatus includes a plurality of functional blocks 20a, 20b, 20c, 20d..., a core 30, and a parameter bus 35. Preferably, each apparatus 10 includes at least one serial input port and one serial output port among the functional blocks 20. A simple standard apparatus (shown for example in FIGS. 4a–4d) capable of performing a plethora of functions might include as functional blocks: two serial input ports; a serial output port; an eight bit bi-directional parallel port; a twelve bit A/D converter; a twelve bit D/A converter; and eight twenty-four bit biquadratic filter processors. Of course, many other functions could be encompassed by the provided functional blocks including, without limitation FIR processors, modulators, summing junctions, rectifiers, limiters, microprocessors and amplifiers. Typically, each functional block is arranged in a standard integrated circuit format as is well known in the art. Also, as will be described in more detail below, each functional block 20 is arranged to interface with core 30 both via a parameter bus 35 for receiving parametric information and via serial busses of a core switching matrix (seen in FIG. 2).

All communications to and from the functional blocks 20 with the exception of the port blocks is via core 30. Core 30, which is the physical and operational heart of the apparatus 10 is also responsible for functions other than controlling data flow into and out of the functional blocks. These functions include: interfacing to a main communications bus 40; interpreting all data into and out of the apparatus 20, including signal, parametric, and topological data; providing necessary timing signals to control data flow; and providing data routing via a non-blocking matrix switch (seen in FIG. 2). Preferably, the core 30 also provides a test function as will be described hereinafter.

As will be appreciated from FIG. , one manner of communicating with apparatus 10 is via the main communications bus 40. Main communications bus 40 is preferably a parallel bus of eight bit width for data and four bit width for core address. In arranging apparatus 10 upon start-up, parametric and topological information (respectively for the functional blocks and the switching matrix of the core) is sent to the core 30 of apparatus 10 from an external processor or memory (not shown) via communications bus 40 as will be detailed below. The topological information is stored in resident memory of the core (which can be associated RAM, EPROM, or the physical burning of paths) and is used to arrange the switching matrix (which includes serial busses) of the core so that the functional blocks 20 will be properly connected to perform the desired function. Parametric data, on the other hand, is sent from core 30 via parametric bus 35, which is preferably a parallel bus of twenty-four bit width, to the functional block 20 to which it belongs. Only one functional block may be loaded with parametric data at a time. Functional blocks 20 store the parametric data in resident memory which also can range from volatile, to semi-volatile to permanent memory.

It will be appreciated that different types of data (e.g. parametric, signal, and topological data) are coded differently to permit the core 30 to interpret the same. Of course, in order for core 30 to "interpret" the received data and send it to its proper destination, core 30 preferably includes a decoder (generally termed a "processor"). In accord with the preferred embodiment, and as seen in FIG. 2, decoder 110 receives four address bits from the communications bus 40, thereby allowing sixteen different address locations to be addressed. If the four bit address code indicates address zero, one, or two, the data contained on the eight bit section of communications bus 40 is considered part of a twenty-four bit word which is stored in respective eight-bit registers of parametric receiving circuit 120. If the four bit address code indicates address three, the eight bit data word contained on bus 40 is a destination register for the twenty-four bit word stored in the parametric receiving circuit. Thus, three bits of the eight bit word destination might designate which of up to the five coefficients of a biquad filter is to receive the twenty-four bit (parametric) word, while three additional bits might be used to designate which of up to eight biquad filters is being addressed. An additional bit or two might be used to indicate that the data in the parametric receiving circuit 120 is not parametric data but is in fact signal data which is to be sent to a filter input of a first or second independent system which are created by having asynchronous channels (as described more fully hereinafter).

If the four address bits decoded by address decoder 110 indicate addresses four, five or six, the eight bit word on the bus 40 is sent to topology definition registers 130 which are used to configure the matrix switch. Thus, with address four, output configurations are set with three bits of the eight bit word used to define the biquad output for channel A, and three additional bits used to define the biquad output for channel B. The remaining two bits select from one of four modes: channel A is output from the digital/analog converter; channel B is output from the digital/analog converter; channels A an B alternate; and all eight biquad filter outputs are scanned. Where the address is five, the input configurations are set, with two sets of two bits used to define each of four different possibilities for each of the two channels: input from the A/D converter; input from a first serial port; input from a second serial port; and input from the parallel port. Fifth and sixth bits are used to partition the order of the channels, while seventh and eighth bits define input and output port data lengths (e.g. twenty-four or sixteen bits). Where the address is six, the outputs are defined, with three bits used to define the output for the first channel registers, three bits used to define the output for the second channel registers, and two bits used to select one of up to four biquad filters for the serial out port.

Finally, where the address of the four bit address received by address decoder 110 is seven through twelve, a byte of data from any of six output registers 140 is chosen to be placed onto bus 40. The bytes of data in registers 140 are obtained from the biquad processor functional blocks in a serial manner and are formed into eight bit bytes in the registers 140.

As seen in FIG. 2, core 30 also preferably includes an EPROM load circuit 150 which is essentially a counter. The counter prompts locations in an EPROM which may be associated with the apparatus 10 or may be associated with a host, and the EPROM then places address and associated data on the communications bus 40 to configure the apparatus 10 with the desired topology and parametric information.

While parametric and topological data are received via main communications bus 40, signal data is typically received via the serial and/or parallel ports, or the A/D converter (functional blocks 20) of the apparatus 10 and then forwarded to the core 30 via the busses 170 of thswitching matrix 160 of the core. Once reaching the switching matrix 160 of the core, the signal data is routed to another functional block 20 in accord with the topology of the core. If the signal processing of the functional block does not complete the processing of the signal data, the partially processed signal data is then sent to one or more other functional blocks via the switching matrix of the core either in a serial or parallel manner. That is, while all signal data is transferred serially (i.e. bit by bit) by the busses 170 of switching matrix 160, the functional blocks may be chained together via the switching matrix of core 30 in a serial manner, or if desired, several functional blocks may receive the output of another functional block in parallel to accomplish the desired signal processing. Regardless, when the processing is completed, the signal data may be sent out of the apparatus 10 via an output port functional block (serial or parallel), via the D/A converter, or via parallel output registers 140 of core 30 and communications bus 40.

As aforestated, signal data may enter and exit apparatus 10 via the main communications bus 40 (address bits set to value three, with sixth and seventh data bits set to indicate the sending of signal data to independent system). If communications bus 40 is connected to a computer, such signal data communications is critical for computer interaction. Thus, signal data to be communicated to the apparatus 10 is stored by the host computer until it desires to send the data to apparatus 10. Then, by providing a proper address code and the data, the data may be sent to a desired location. Signal data to be received by the host from the apparatus 10 is stored in parallel output registers 140. When the host requests that signal data by sending the proper code (address codes seven through twelve), the apparatus 10 sends the data via bus 40. Because the main communications bus 10 is controlled by the host, communications via bus 40 tends to be slower than the serial communication of signal data internal apparatus 10. The separation of the manner and means of handling signal data from the manner and means of handling parametric and topological data provides broad flexibility and increased apparatus speed.

Figure 3:
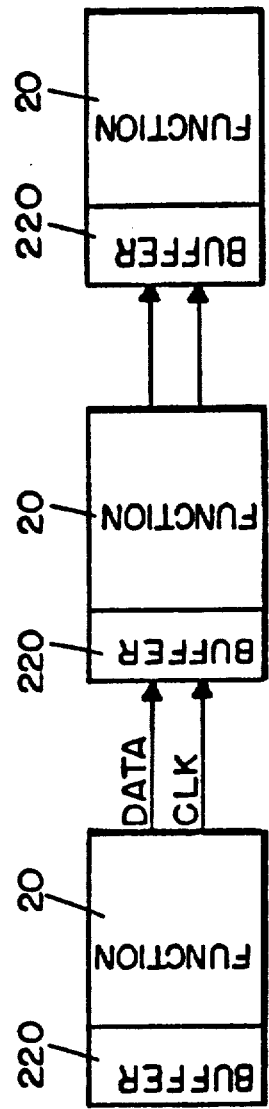
FIG. 3 is a block diagram of an alternative embodiment of the functional blocks of FIG. 1.

As aforementioned, core 30 provides timing signals for controlling the flow of data through the apparatus 10. As each of the functional blocks 20 requires timing signals for proper operation, if a single clock is used to control data flow, the clock must be set to permit the slowest of the functional blocks to complete its most time-consuming task. The resulting timing signal would include a period for signal processing, i.e. computation, the end of which would comprise a period for signal transfer via the switching matrix of the core to the next desired location. While the timing generator (clock) for the apparatus 10 need not be local to the apparatus itself, the maximum number of independent asynchronous channels that can be handled by the apparatus is equal to the number of timing generators associated with the apparatus.

Where the functional blocks 20 are relatively straight-forward, the afore-described processing scheme permits extremely high speed. However, where the functional blocks 20 might include more complicated elements such as microprocessors, a different timing scheme might be more useful. Thus, turning to FIG. 3, an alternative arrangement is shown where each functional block 20 is provided with a buffer 220. With the provided buffer, the apparatus 10 need not have any formal signal flow and each functional block can raise a flag when its computation is completed. The core 30 checks for flags, and if all flags are not raised by the time a next sample arrives, an error will be flagged. The provided buffered arrangement, however, permits particular functional blocks to process data over several cycles without outputting serial results. Thus, if properly arranged, other signal processing may be accomplished without incurring time penalties due to the relatively low processing nature of one of the functional blocks.

Returning to FIG. 1, it is seen that core 30 of apparatus 10 further interfaces with inter-node busses 45, which are preferably simply timing and signal data busses. Thus, each provided apparatus 10 can be made part of a larger circuit or system including several identical or architecturally similar apparatus by providing bus links 45 between the cores of the apparatus. Because timing signals may be transferred via bus links 45, the manner of accomplishing the afore-mentioned possibility of a non-local clock, and/or multiple clocking signals and hence multiple asynchronous channels becomes evident. With a multiple of clocks, not only may two or more different signals pass through the switch matrix of the core at one time (provided the topology is such that the signals are non-conflicting), but previously conflicting signals may now be made non-conflicting by proper timing control. It is also of note, that the topology of the switch matrix 160 of the core may be switched during the functioning of a single program by properly controlling the timing of the flow of topological data into apparatus 10. Thus, depending upon the program controlling apparatus 10, the apparatus can change topology at preset time intervals, or can dynamically change topology based on the results of signal data received by the host from apparatus 10 or based on other information.

With ability to configure a plurality of apparatus 10 into a system, and in accord with another aspect of the invention, wafer scale integration is provided with redundant apparatus 10. In the larger system, the cores 30 of the apparatus 10 are preferably provided with a testing function. Instructions which can test the functioning of the various functional blocks as well as self-diagonstic instructions are kept in memory associated with the core 30. Upon powering-up of the apparatus 10, the core 30 tests the functional blocks 20 as well as itself. If any block is not working, the core will not permit a configuration which includes the non-working functional block. If the desired application requires the use of such a block, the core will send an error message via the main communications bus to the host to indicate the same, and a redundant apparatus 10 may be configured and used. Likewise, if the core is deficient in some manner but is capable of communicating with a host, it can send a self-diagnostic analysis to the host.

Figures 4A, 4B:
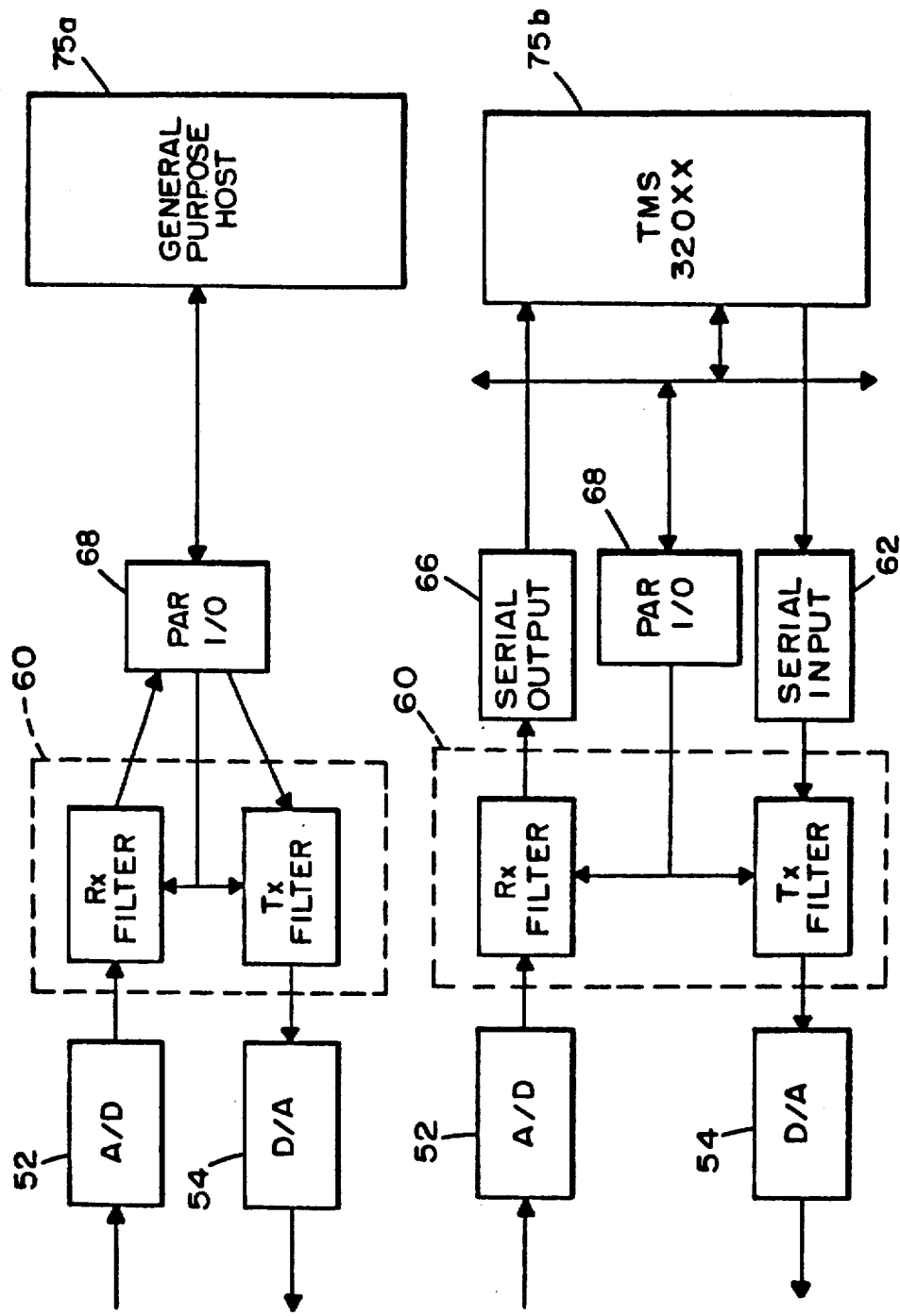
FIGS. 4a–4d are block diagrams of different arrangements of a single apparatus of the invention, with FIG. 4a representing an analog to digital interface, FIG. 4b representing an analog to digital interface for a TI DSP, FIG. 4c representing a sixteenth order filter, and FIG. 4d representing a servo control system.

Turning to FIGS. 4a–4d, an example of a single apparatus 10 configured in four different ways is shown. Apparatus 10 of FIGS. 4a–4d includes twelve bit A/D and D/A converters 52 and 54 respectively, eight twenty-four bit biquadratic filter processors 60, two serial input ports 62 (the second port not shown) a serial output port 66, and an eight bit bi-directional parallel port 68. FIG. 4a depicts a classical analog/digital interface with signal data being received by A/D converter 52, filtered by a subset of filter processors 60, and sent via bi-directional parallel port 68 to a general purpose host computer 75a. Signal data leaving computer 75a is sent via bi-directional port 68 to the transmit filter subset of filter processors 60 and out of apparatus 10 via D/A converter 54.

FIG. 4b also depicts an analog/digital interface However, the interface of FIG. 4b is for a Texas Instruments TMS 320XX range of digital signal processors. Signal data being received is processed by the A/D converter 52, filtered by the receiving filter subset of filter processors 60 and sent to serial output port 66 for forwarding to the processor 75b. Signal data leaving processor 75b is sent via serial input port 62 to the transmit filter subset of filter processors 60. The filter digital signal data is then D/A converted by converter 54. Parallel port 68 is used to access the parametric bus of the apparatus 10 for dynamic assignment of parameters for biquad filters 60.

Figure 4C:
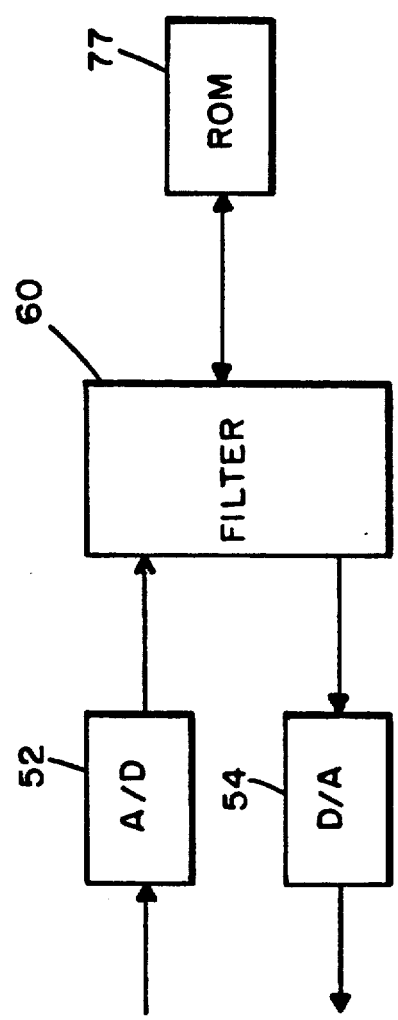

FIG. 4c depicts a sixteenth order filter Signal data is converted by A/D converter 52 into digital signal data, and filtered by filter processors 60. The parameters of the sixteenth order filter are stored in ROM 77 which received the parameters via the parameter bus of the apparatus 10 and which arranged filters 60 accordingly. The filter of FIG. 4c, reconverts the now-filtered signal into analog signal data at D/A converter 54.

Figure 4D:
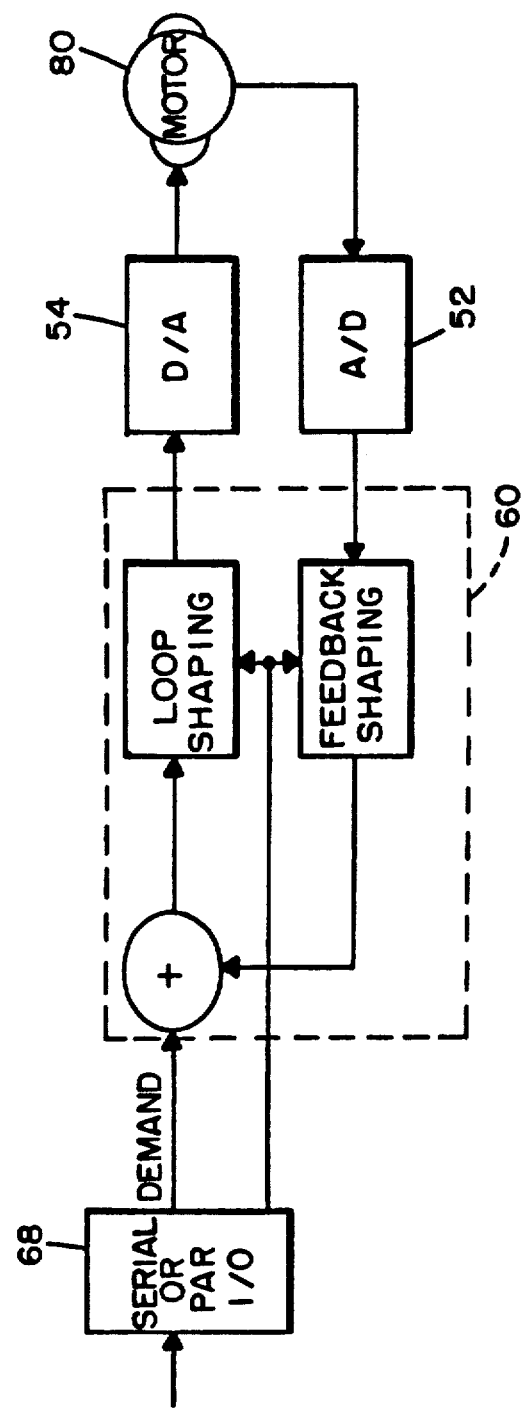

FIG. 4d depicts a servo control system. The positional demand enters the system via a serial input port 62 or the parallel port 68 and is applied to a summing junction which is embodied in a biquad filter 60. The output of the summing junction is passed via a subset of the biquad processors 60 to a D/A converter 54. The biquad processors are programmed to form the forward compensation and gain of the overall loop. The D/A converter output is used, via a power amplifier (not shown) to drive the motor 80. The output of a positional sensor (not shown) on the servo (not shown) is digitized by A/D converter 52 and fed to another subset of biquad processors 60 for any feedback shaping that might be required. The output of the feedback is returned to the input summing junction to complete the loop.

It will be appreciated that depending upon the functional blocks incorporated into apparatus 10, and the ability to network a plurality of the apparatus 10 into a larger system, a plethora of applications can be accomplished. For example, typical applications in instrumentation might include: spectrum analysis; function generation; pattern matching; seismic processing; transient analysis; digital filtering; and phase locked loops. In voice/speech, typical applications would include: voice mail; speech vocoding; speech recognition; speaker verification; speech enhancement; and speech synthesis. Similarly, many different control, military, automotive, telecommunications, medical, industrial, consumer, graphics/imaging, and general purpose DSP applications would be readily apparent Indeed, wherever integrated circuit technology is useful, the apparatus of the invention could be utilized.

Preferably, the provided apparatus and system are part of a user-friendly custom chip building system which may be used in conjunction with a host computer. Software which will run on the computer is provided to permit a user to specify a desired arrangement of functional blocks and parameters for each block. In fact, preferably, a user could draw a desired filter frequency response with a mouse, light pen, or similar input device, and the computer could determine the required filter parameters which could accomplish the desired frequency response. The computer could then automatically configure the apparatus or plurality of linked apparatus by generating and providing (via the main communication bus) the necessary topological and parametric data required to accomplish the desired result. The user would then be able to test the functioning of the apparatus in its desired environment. If changes were required either in the format of the chip apparatus (i.e. topological changes), in the parameters of the functional blocks (i.e. parametric changes), or in the clocking, the necessary reprogramming would be easily accomplished and the apparatus could be retested. When the desired results are obtained, the master program containing the topological, parametric and necessary signal data can be stored in the host processor or an associated non-volatile memory so that the apparatus or system can be reloaded at any time. Of course, where static chips are to be manufactured (i.e. changes in the matrix switching or functional block parameters are not necessary during the running of a program), the parameters and topology can be burned into the chip for permanent memory.

There has been described and illustrated herein a programmable apparatus which can be utilized as the equivalent of a custom designed integrated circuit device, and a method of utilizing the same. While particular embodiments of the invention have been described, it is not intended that the invention be limited exactly thereto, as it is intended that the invention be as broad in scope as the art will permit. Thus, while a particular addressing scheme was described for distinguishing between topological, parametric, and signal data, and particular addressing was described for setting the switch matrix topology and the parameters of the functional blocks, it will be appreciated that other techniques (e.g. coding, timing, or hardware) could be utilized to accomplish the same. For example, different busses could be used for different types of data. With such a configuration, the core would not necessarily have to decode all incoming data to determine its destination as parametric data could be sent directly to the parametric bus. Further, it should be appreciated that terminology such as "processing", and "operation" are intended to be understood in their broadest sense. Thus, all functional blocks perform an "operation" on data, whether it be a timing operation (e.g. buffering, or serial/parallel transformation), a mathematical operation (e.g. summing, multiplying, etc.), a filtering operation (e.g. A/D or D/A conversion, low or high pass filtering, etc.), an interface function (e.g. voltage step-up or step-down; frequency change;, etc.) or other operation. Similarly, in performing an operation, the functional blocks and the core of the programmable apparatus "process" data. Further yet, while an apparatus having particular functional blocks was disclosed, it will be appreciated that the exact combination of desired functional blocks in a given apparatus could vary widely. Likewise, while the main communicaions bus was described as interfacing with a host, those skilled in the art will appreciate that, depending on the circumstances, the host could be (without limitation) a computer, a microprocessor, or an EPROM. In the designing process and where chip topology is required to be adaptive, the host is often a computer or a microprocessor. However, where the apparatus topology is static and the topology and functional block parameters are finalized, an EPROM can serve to properly initialize the switch matrix and functional blocks upon powering up of the apparatus. Of course, in such circumstances, the EPROM could also be eliminated by metallizing the apparatus or otherwise effectively hard coding the topology and functional block parameters. Therefore, it will be apparent to those skilled in the art that other changes and modifications may be made to the invention as described in the specification without departing from the spirit and scope of the invention as so claimed.

I claim:

1. A programmable integrated circuit real time signal processor apparatus which interfaces with a communications bus, said signal processor apparatus comprising:
    (a) a plurality of high level functional block means including at least two of filter means, digital to analog converter means, rectifier means, modulator means, microprocessor means, and other high level processing means, each of said plurality of functional block means for performing in real time a different operation on signal data received by said functional block means, said plurality of functional block means having different basic configurations and structures and resultingly different high level functions and capabilities, wherein the operation of each high level functional block means is affected by internal parameters provided to the functional block means;
    (b) a core means comprising interface means for interfacing with said communications bus, processing means for distinguishing between at least topological and parametric data received by said core means over said communications bus, and matrix switching means for interconnecting said plurality of functional block means in a desired manner in response to said topological data received over said communications bus and thereby controlling the specific interconnection between the high level functional block means and hence the functionality of said signal processor apparatus, wherein parametric data received by said processing means is sent by said processing means via a parametric bus to a plurality of said functional block means to control respective of said internal parameters and resultingly the operational characteristics of said plurality of functional block means;
    (c) timing function means for receiving timing signals from a timing generator and for controlling the sequential flow of at least said signal data in response thereto in order to maintain real time signal processing.

2. A programmable apparatus according to claim 1, further comprisign:
    (d) said parameter bus; and
    (e) a first programmable memory means, for storing at least topological data for said programmable apparatus.

3. A programmable apparatus according to claim 2, wherein:
    said first programmable memory means is associated with said core means and receives topological data via said communications bus.

4. A programmable apparatus according to claim 2, further comprising:
    at least one second programmable memory means, for storing
    (f) parametric data for said functional block means.

5. A progrmamable apparatus according to claim 4, wherein:
    one of said second programmable memory means is associated with each of said functional block means, and said functional block means receive parametric data from said communications bus via said core means and said parametric bus.

6. A programmable apparatus according to claim 1, wherein: at least part of said timing function means is associated with each of said plurality of functional blocks, wherein each of said plurality of functional blocks further comprise buffer means for storing signal data and flag means for indicating to said timing function means that the associated functional block has finished processing signal data.

7. A programmable apparatus according to claim 7, wherein:
    said processing means of said core means distinguishes between topological data, parametric data, and signal data.

8. A programmable apparatus according to claim 7, wherein:
    said switch matrix means is dynamic such that said switch matrix means is configured in a first configuration during a first time period for switching said serial flow of signal data and is configured in a second configuration during a second time period for switching said serial flow of signal data.

9. A programmable apparatus according to claim 1, wherein:
    said timing function means provides cycles having a computational time period terminating in a transfer time period for at least said signal data, and said functional block means provides an output during said transfer time periods.

10. A programmable apparatus according to claim 9, wherein:

during at least one of said transfer time periods, at least a first two of said functional blocks provide signal data to at least a second two of said functional blocks via said switching network means.

11. A programmable apparatus according to claim 1, further comprising:

(d) a programmable non-volatile memory means coupled to at least one of said communications bus and said core means, said memory means containing at least said topological and said parametric data.

12. A programmable system, comprising:

(a) a communications bus;

(b) a plurality of real time programmable integrated circuit signal processor apparatus which interface with said communications bus, each said apparatus comprising, (1) a plurality of high level functional block means including at least two of filter means, digital to analog converter means, rectifier means, modulator means, microprocessor means, and other high level processing means, each of said plurality of functional block means for performing in real time a different operation on signal data received by said functional block means, said plurality of functional block means having different basic configurations and structures and resultingly different high level functions and capabilities, wherein the operation of each high level functional block means is affected by internal parameters provided to the functional block means;

(2) a core means comprising interface means for interfacing with said communications bus, processing means for distinguishing between at least topological and parametric data received by said core means over said communications bus, and matrix switching means under control of said processing means for interconnecting said plurality of functional block means in a desired manner in response to topological data received by said processing means over said communications bus and thereby controlling the specific interconnection between the high level functional block means and hence the functionality of said signal processor apparatus, wherein parametric data received by said processing means is sent via a parameter bus to at least a a plurality of said functional block means to control respective of said internal parameters and resultingly the operational characteristics of said plurality of said functional block means;

(3) timing function means for receiving timing signals from a timing generator and for controlling the sequential flow of at least said signal data in response thereto in order to maintain real time signal processing; and (c) linkage means for connecting at least two of said plurality of programmable apparatus via their respective core means.

13. A programmable system according to claim 12, wherein said core means of each of said plurality of programmable apparatus further comprises test function means for teating at least one of said functional block means to determine whether said at least one of said functional block means is functioning properly.

14. A programmable system according to claim 13, wherein:

said system is a wafer-scale integrated system, said plurality of programmable apparatus includes at least one redundant apparatus such that where a test function determination is made that a first programmable apparatus is not properly functioning, said redundant apparatus may be configured in said system in lieu of said first programmable apparatus.

15. A programmable system according to claim 12, wherein:

each of said programmable apparatus further comprises a parameter bus, a first programmable memory means associated with said core means for storing at least topological data for said programmable apparatus, and at least one second programmable memory means associated with one of said functional block means for storing parametric data for said functional block means.

16. A programmable system according to cliam 12, wherein:

said linkage means carry at least said signal and timing data between said respective cores of said at least two of said plurality of programmable apparatus.

17. A programmable integrated circuit real time signal processor apparatus which interfaces with a communications bus, said apparatus comprising:

(a) a plurality of high level functional block means including at least two of filter means, digital to analog converter means, rectifier means, modulator means, microprocessor means, and other high level processing means, each of said plurality of functional block means for performing in real time a different operation on signal data received by said functional block means, said plurality of functional block means having different basic configurations and structures and resultingly different high level functions and capabilities, wherein the operation of each high level functional block means is affected by internal parameters provided to the functional block means;

(b) a core means comprising interface means for interfacing with said communications bus and for receiving at least topological data, and matrix switching means for interconnecting said plurality of functional block means in a desired manner in response to said topological data received over said communications bus, and thereby controlling the specific interconnection between the high level functional block means and hence the functionality of said signal processor apparatus;

(c) a parametric bus for receiving and forwarding to said plurality of functional block means parametric data for controlling respective of said internal parameters and resultingly the operational characteristics of said plurality of functional block means; and (d) timing function means for receiving timing signals from a timing generator and for controlling the sequential flow of a least said signal data through said functional block means and said matrix switching means in response thereto in order to maintain real time signal processing.

18. A programmable apparatus according to claim 17, further comprising:

(e) a programmable non-volatile memory means coupled to said communications bus and said parametric bus, said memory means containing at least said topological and said parametric data.

19. A method for designing a custom programmable integrated circuit signal processor apparatus, said apparatus interfacing with a communications bus and having a plurality of high level functional block means having different basic configurations and structures and resultingly different high level functions and capabilities an dhaving respective parameters for performing different operations on received signal data, a core means for interfacing with said communications bus, for distinguishing between at least topological, signal, and parametric data received by said core means over said communications bus, and for interconnecting said plurality of functional block means in a desired manner to thereby control the functionality of said signal processor apparatus, a parametric bus means for carrying parametric information from said core means to said functional block means and timing function means for controlling the sequential flow of at least said signal data in response thereto in order to maintain real time signal processing, said method comprising:

(a) determining suitable interconnections of said plurality of high level functional blocks;

(b) determining suitable parameters for said plurality of functional block means;

(c) arranging said core means by coding said determined suitable interconnections into first code comprising said topological data and forwarding said first code via said communications bus to said core means to cause said core means to assume said determined suitable interconnections; and (d) providing said determined suitable parameters for said plurality of high level functional block means to said plurality of high level functional block means by coding said suitable parameters into second code and forwarding said second code via said communications bus to said core means to cause said core means to send said suitable parameters via said parametric bus to respective desired functional block means.

20. A method fo designing a custom integrated circuit signal processor apparatus having a plurality of functional block means having desired parameters for performing desired operations on received signal data in relat ime, a core means interconnecting in a desired manner said plurality of functional block means, and a timing function means for controlling the sequential flow of at least signal data through said core means and said functional block means in response thereto in order to maintain real time signal processing, said method comprising:

(a) obtaining a programmable integrated circuit signal processor apparatus which interfaces with a communications bus, said apparatus having a plurality of high level functional block means for performing operations in real time on received signal data, said plurality of functional block means having different basic configurations and structures and resultingly different high level functions and capabilities, wherein he operation of each high level functional block means is affected by internal parameters provided to the functional block means, a core means for interfacing with said communications bus and for interconnecting said plurality of functional block means in a desired manner, a parametric bus means for obtaining and carrying parametric data to said functional block means, and timing function means for controlling the sequential flow through said core means and said functional block means of at least signal data in order to maintain real time signal processing;

(b) in conjunction with a host coupled to at least said communications bus and said programmable apparatus, determining suitable interconnections of said plurality of high level functional blocks of said programmable apparatus, and determining respective suitable parameters for respective of said high level functional block means of said programmable apparatus;

(c) arranging said core means of said programmable apparatus by coding said determined suitable interconnections into first code and forwarding said first code via said communications bus to said core means to cause said core means to assume said determined suitable interconnections; and (d) providing said determined suitable parameters for said plurality of high level functional block means to respective of said high level functional block means of said programmable apparatus by coding said suitable parameters into second code and forwarding said second code via said parametric bus to respective desired functional block means of said programmable apparatus;

(e) testing said programmable apparatus to determine whether said programmable apparatus is suitable for performing said desired operations;

(f) finalizing core interconnection design and parameter values for said functional block means; and (g) hard coding said core and said functional block means of said custom apparatus in accord with said finalized core interconnection design and parameter values.

* * * * *